United States Patent

Stone

[15] 3,638,175
[45] Jan. 25, 1972

[54] NOISE REDUCTION ON SEISMIC RECORDS

[72] Inventor: Webster R. Stone, Sydney, New South Wales, Australia

[73] Assignee: Esso Production Research Company

[22] Filed: Mar. 10, 1970

[21] Appl. No.: 18,156

[52] U.S. Cl. ..........................................340/15.5
[51] Int. Cl. .............................................G01v 1/36
[58] Field of Search..................................340/15.5

[56] References Cited

UNITED STATES PATENTS

| | | | |
|---|---|---|---|
| 2,438,217 | 3/1948 | Johnson | 340/15.5 |
| 3,419,846 | 12/1968 | Michon | 340/15.5 |
| 3,321,740 | 5/1967 | Lee | 340/15.5 |
| 2,767,389 | 10/1956 | McCollum | 340/15.5 |
| 3,447,126 | 5/1969 | Reid | 340/15.5 |

Primary Examiner—Rodney D. Bennett, Jr.
Assistant Examiner—N. Moskowitz
Attorney—James A. Reilly, John B. Davidson, Lewis H. Eatherton, James E. Gilchrist, Robert L. Graham and James E. Reed

[57] ABSTRACT

Certain types of coherent noise on seismic records made from a plurality of seismic disturbances in the same local area, is eliminated by reversing the polarity of the signals to be recorded on alternate recordings, or on half of the total number of recordings. The recorded signals are reproduced and summed with the polarity of half of the reproduced signals again reversed so that reflection events are in time-phase. Coherent noise originating within the recorder will be of opposite time-phase and will not appear on the summed record.

3 Claims, 8 Drawing Figures

PATENTED JAN 25 1972 3,638,175
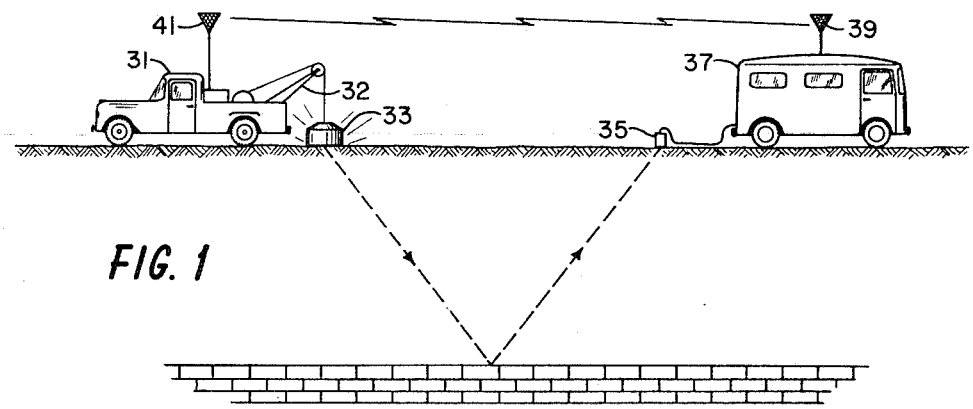
FIG. 1
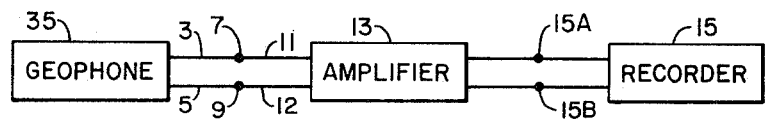
FIG. 2A
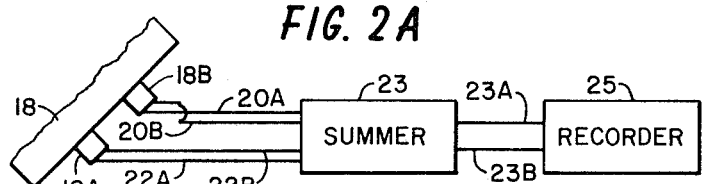
FIG. 2B
FIG. 3A
FIG. 3B
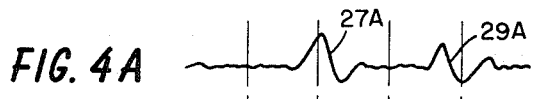
FIG. 4A
FIG. 4B
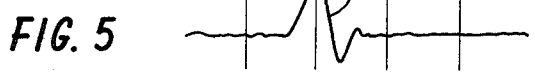
FIG. 5
INVENTOR.
WEBSTER R. STONE
BY
ATTORNEY 3,638,175

1

NOISE REDUCTION ON SEISMIC RECORDS

BACKGROUND OF THE INVENTION

This invention relates to the art of seismic exploration and more particularly to the reduction of coherent noise events on geophysical records obtained by the seismic technique.

One of the methods for practicing the seismic technique involves the generation of a number of relatively low energy seismic disturbances in the same local area at or near the earth's surface. Seismic waves produced by such disturbances are detected at one or more detection stations located along a traverse with the local area or generating station, and are recorded. The records produced corresponding to each generating station are subsequently summed or composited in order to produce a single record whereon events produced by reflections of seismic waves from subsurface reflecting horizons are reinforced and enhanced, while random noise events, which are gaussian in nature, tend to cancel each other and are minimized on the final record. The general technique is described in U.S. Pat. No. 2,851,122—McCollum.

Unfortunately, there are various types of noise recorded by the technique described above which are coherent or non-gaussian in nature and which tend to reinforce each other in the same manner as do reflection events. The events produced by this type of noise are of much higher amplitude than are reflection events and can easily obscure the reflection events when they are recorded concomitantly therewith. One type of noise of this nature is that produced by mechanical shocks to the recording system which tend to occur at the same time on each recording interval. Even the most careful mechanical design of the recording system has been found to be ineffective in eliminating all of such mechanical shocks. Therefore, one of the objects of this invention is to provide a technique for eliminating certain coherent noise records from seismic records produced by compositing records resulting from low energy seismic disturbances.

SUMMARY OF THE INVENTION

In accordance with the present invention, seismic disturbances are produced at the same general location at or near the earth's surface and the seismic waves produced thereby are recorded at at least one detecting locating located on a transverse with the transmitting location. When the seismic waves are detected, as by geophones, electrical signals are produced which are indicative of the amplitude of the detected seismic waves. The electrical signals corresponding to half of the total number of seismic disturbances are recorded with a polarity which is the reverse of the polarity of the signals corresponding to the other half of the total number of seismic disturbances. Subsequently, the recorded signals are reproduced and composited with the polarity of the signals corresponding to the first half of the seismic disturbances being again reversed so that events thereon indicative of reflections from the same reflection horizon are in time-phase and tend to cancel each other. Events resulting from sources inside the recording system are summed while of opposite time phase relationship and tend to cancel each other.

Objects and features of the invention not apparent from the above discussion will become apparent upon consideration of the following detailed description thereof when taken in connection with the accompanying drawings which should be taken in an illustrative sense and not in a restrictive or limiting sense.

BRIEF DESCRIPTION OF THE DRAWINGS

In the drawings:

FIG. 1 is an illustration of suitable apparatus for performing seismic observations of the general type contemplated by the present invention;

FIG. 2A is a schematic electrical diagram of seismic wave detecting and recording apparatus for field recording in accordance with the invention;

FIG. 2B is a schematic electrical diagram illustrating reproducing apparatus in accordance with the invention; and FIGS. 3A, 3B, 4A, 4B, and 5 are wave form diagrams on the same time scale, which are useful in understanding the operation of the apparatus in FIGS. 1, 2A, and 2B.

DESCRIPTION OF THE PREFERRED EMBODIMENT

Refer now to FIG. 1 wherein is illustrated a typical field setup for performing seismic observations of the type contemplated by the present invention. In FIG. 1 there is illustrated a seismic source unit 31, here illustrated as a conventional weight-dropping truck carrying a very heavy weight 33 suspended from a cable at the end of a boom 32. The cable is controlled by suitable prior art apparatus such as described in U.S. Pat. No. 2,897,907 of Frank C. Chalmers et al. The weight-dropping or thumping technique has been widely practiced for many years and has been described in some detail in the aforementioned U.S. Pat. No. 2,851,122 to McCollum. There is also illustrated in FIG. 1 a recording unit, here shown as a recording truck 37, which may carry a conventional seismic recorder of either the analog or digital type and a radio transmitter for sending drop command signals to the source unit 31 by means of transmitting antenna 39 and receiving antenna 41. There is also illustrated a single geophone 35 for detecting seismic waves produced when the heavy weight 33 strikes the ground. While only a single geophone is illustrated, it is to be understood that a number of geophones may be arranged along a traverse on which is located the transmitting station at which the weight 33 is dropped. It is also to be understood that a plurality of detecting stations may be used, and that a star array such as described in U.S. Pat. No. 2,759,551 of C. H. Carlisle et al. may be used at a single detecting station for the purpose of minimizing ground roll that inevitably accompanies the production of a seismic disturbance at or near the earth's surface. It is also to be understood that a number of clusters of geophones may be used in the event a plurality of geophones stations are lineally arranged along a seismic transverse, the geophones in each cluster being interconnected so as to maximize detected reflection signals and minimize signals produced thereby as the result of ground roll.

The intensity of the seismic disturbance produced by a dropped weight is quite small relative to the intensity of the disturbance produced by detonation of a charge of dynamite in a shothole. When a weight is dropped seismic waves produced by the weight striking the earth travel downwardly through the earth and some of the energy is reflected by a seismic wave reflection horizon produced as the result of strata in the earth having different seismic wave propagation characteristics. Such signals will be detected at the geophone stations, such as geophone 35, at the earth's surface and will be recorded by the recording equipment in the unit 37 to which the geophone or geophones 35 is connected. Since the intensity of the disturbance produced by the dropped weight is quite low, the intensity of signals reflected back to the earth's surface will be very low relative to the intensity of seismic signals produced by uncontrollable extraneous seismic sources, such as general ground unrest, the wind, vehicles passing nearby, and the like. Therefore, it is necessary to build up the events produced by the reflected seismic waves relative to the intensity of the events produced by the other seismic sources. To this end, the weight 33 is dropped a number of times in the same local area, preferably within the area defined by a 400 foot square or smaller, most preferably at locations on or near the seismic transverse. The signals produced by the weight 33 are individually recorded and later are summed together (as described in the aforementioned McCollum patent) so that the reflection events add together and the noise events, which generally are of a guassian nature, cancel out. However, as described above, coherent events produced on the records by the recording mechanism likewise tend to reinforce each other during the summing or compositing process.

With reference now to FIGS. 2A and 2B, the geophone 35 is illustrated as being connected to the input terminals 15A and 15B of a conventional seismic wave recorder 15 through an amplifier 13 having input terminals 7 and 9. The geophone is connected to the input terminal through leads 3 and 5, and the terminals 7 and 9 are connected to the rest of the amplifier by leads 11 and 12. Signals produced by the geophone 35 thus are amplified by the amplifier 13 for recording by the recorder 15. Manifestly, in practice a number of geophones may be used, the signals of which will be recorded by the recorder 15 after having been individually amplified by other amplifiers. Likewise, it is apparent that as a result of the production of seismic disturbances through the repeated dropping of weight 33 a number of traces will be produced which may be recorded side by side. Alternatively individual records may be produced which are of a nature that permits the faithful reproduction of these recorded signals. Thus the signals can be recorded on magnetic tape either in analog form or in digital form.

For convenience of illustration is will be assumed that the signals have been recorded in analog form and that they have been conveyed to a magnetic reproducer 18 having a plurality of reproducing heads, two of which are here designated by the reference numerals 18A and 18B. The output leads from the reproducing heads, designated by the reference numerals 20A, 20B, and 22A, 22B are connected to a summing circuit 23 which functions to composite the signals applied thereto so as to produce a single composite signal on the output leads 23A and 23B thereof of which are recorded by another seismic recorder 25. The seismic recorder 25 may, if desired, be of the type adapted to a record either in visual form or on magnetic tape. Suitable recorders of this nature are manufactured by Geospace Corporation of Houston Texas.

The invention will now be described in connection with FIGS. 1, 2A, and 2B. Let it be assumed that the weight 33 is dropped a plurality of times at a transmitting station such that the locations of the wave drops are in the same local area, preferably within an area defined by a 400 foot square, or smaller. The seismic signals produced thereby will be detected by geophone 35 for recordation by recorder 15. However, the signals produced by geophone as a result of half of the seismic traces are recorded with the geophone connected to terminals 7 and 9 as illustrated in FIG. 2A while half are connected with lead 3 being connected to terminal 9 and lead 5 being connected to terminal 7. In this manner, half of the electrical signals are recorded with reverse polarity as compared to the other half so that reflected seismic events from the same reflection horizon will be in opposite time-phase relationship. This condition is illustrated in FIGS. 3A and 3B wherein are shown simplified traces in wiggly trace form. FIG. 3A is intended to represent a portion of a trace such as would be produced with the circuit components connected as shown in FIG. 2A; FIG. 3B is intended to represent a trace as would be produced by the apparatus with line 3 connected to terminal 9 and line 5 connected to terminal 7. As can be seen, reflection events 27A and 27B will be of opposite time-phase relationship, whereas events produced by mechanical shocks to the recording system (designated on the drawing by reference numerals 29A and 29B) will be of the same time-phase relationship.

After the geophone signals produced as described above have been recorded the records are now transported to a reproducer 18. The lines 20A and 20B are reversed as compared to what might be termed their "normal" connection, as illustrated by the crossing of the leads. The leads 22A and 22B are in their "normal" connection to the summing circuit 23 so that, when the traces illustrated in FIGS. 3A and 3B are reproduced the reflection events 27A and 27B will be in the same time-phase relationship, as illustrated in FIGS. 4A and 4B. However, since events 27A and 27B are now in the same time-phase relationship, events 29A and 29B will be in opposite time-phase relationship and will cancel out in the summing circuit so that the signal appearing on lines 23A and 23B will be as illustrated in FIG. 5. The event 27C will be the composite of events 27A and 27B whereas no event will appear which corresponds to the undesired coherent events 29A and 29B illustrated in FIGS. 3A and 3B. The final trace recorder on recorder 25, therefore, will contain enhanced reflection events whereas events produced during recording within the recording mechanism will be eliminated.

The summation process can be accomplished in a suitably programmed digital computer if desired. Such summation will be particularly convenient when the initial recordings have been made with a digital recorder.

Manifestly, the invention is suitable for use in connection with other techniques of seismic exploration other than the weight dropping or thumping technique. In marine exploration, for example, it is customary to produce small seismic dusturbances spaced 40 to 50 feet apart. Manifestly, it is quite simple to reverse the polarity at which signals are recorded as a result of the successive disturbances, as by a conventional double pole relay which can be actuated automatically immediately prior to the beginning of the recording interval. Thus the reflections produced by relatively weak seismic disturbances can be added together using the present invention to enhance seismic disturbances can be added together using the present invention to enhance seismic reflections and cancel out unwanted coherent events.

I claim:

1. In the method of seismic prospecting wherein seismic disturbances produced in the same local area of the earth and, after each disturbance, resulting seismic waves are detected by seismic detectors at one or more detecting stations to produce electrical signals corresponding to the detected waves and wherein time records of the electrical signals are produced with a seismic recorder, the method of eliminating coherent noise events produced at the same time location on the records by mechanical shocks within the recorder, comprising:

recording in reproducible form the electrical signals produced as a result of half of the total number of disturbances at the same local area with opposite polarity from the polarity at which are recorded electrical signals produced by the other half of the disturbancs produced at said local area; and forming a composite record by compositing all of the records this produced as a result of he disturbances at said local area, with the records corresponding to half of said disturbances being reversed in polarity so that reflection events on all of the records reinforce each other whereby coherent noise events produced by operation of the recorder are eliminated from the composite record.

2. The method of claim 1 wherein the composite record is formed by:

a. reproducing the initially recorded signals;
b. reversing the polarity of the reproduced signals corresponding to said first half of the disturbances;
c. summing the signals produced by step (b) and the reproduced signals corresponding to the other half of said disturbances; and
d. recording the signal produced by step (c).

3. The method of claim 1 wherein the seismic disturbances are located within an area defined by a 400 foot square.

* * * * *